US008786891B2

(12) United States Patent
Ueda

(10) Patent No.: US 8,786,891 B2
(45) Date of Patent: Jul. 22, 2014

(54) APPARATUS, METHOD, AND STORAGE MEDIUM FOR TRANSFERRING DATA TO A BUFFER

(75) Inventor: Koichi Ueda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 13/168,080

(22) Filed: Jun. 24, 2011

(65) Prior Publication Data

US 2011/0317212 A1 Dec. 29, 2011

(30) Foreign Application Priority Data

Jun. 29, 2010 (JP) ................................ 2010-148204

(51) Int. Cl.
G06F 3/12 (2006.01)
G06F 12/00 (2006.01)

(52) U.S. Cl.
USPC ......................................... 358/1.16; 711/118

(58) Field of Classification Search
USPC .................. 358/1.16; 1/1; 711/118
See application file for complete search history.

(56) References Cited

U.S. PATENT DOCUMENTS

| 5,974,229 | A  | * | 10/1999 | Yoshino .......................... 358/1.9 |
| 6,223,181 | B1 | * | 4/2001  | Goldberg et al. ..................... 1/1 |
| 2004/0073697 | A1 | * | 4/2004  | Saito et al. ..................... 709/233 |
| 2005/0002050 | A1 | * | 1/2005  | Yamamoto ..................... 358/1.13 |
| 2005/0157708 | A1 | * | 7/2005  | Chun ............................. 370/356 |
| 2006/0218264 | A1 | * | 9/2006  | Ogawa et al. .................. 709/223 |
| 2008/0068642 | A1 | * | 3/2008  | Takahashi ..................... 358/1.15 |
| 2008/0285087 | A1 | * | 11/2008 | Perkins et al. ................. 358/400 |
| 2009/0174455 | A1 | * | 7/2009  | Dimitriu et al. ............... 327/295 |

FOREIGN PATENT DOCUMENTS

| JP | H09-275478 | A | 10/1997 |
| JP | 11-188953  | A | 7/1999  |
| JP | 2003-044235 | A | 2/2003 |
| JP | 2005-119060 | A | 5/2005 |
| JP | 2005-174145 | A | 6/2005 |
| JP | 2008-112413 | A | 5/2008 |
| JP | 2009-099065 | A | 5/2009 |

OTHER PUBLICATIONS

Machine translation for JP 2008-112413, IDS.*

* cited by examiner

Primary Examiner — Qian Yang
(74) Attorney, Agent, or Firm — Canon USA Inc IP Division

(57) ABSTRACT

An information processing apparatus includes a buffer, an output unit configured to output data held in the buffer to an output device, and a transfer unit configured to transfer data held in a memory to a buffer of the output unit, wherein the transfer unit transfers the data held by the memory in a first mode in which data of an amount corresponding to a size of the buffer of the output unit is transferred and then, transfers the data held by the memory in a second mode in which data of an amount smaller than the size of the buffer of the output unit is transferred a plurality of times.

22 Claims, 19 Drawing Sheets

APPARATUS, METHOD, AND STORAGE MEDIUM FOR TRANSFERRING DATA TO A BUFFER

BACKGROUND OF THE INVENTION

1. Field of the Invention

The present invention relates to an information processing apparatus used for connection to an output device to print, display, or output particularly digital image data in information processing for data transfer, an information processing method, and a storage medium storing a program.

2. Description of the Related Art

When image data is output (display, print, or data transmission), real-time properties to output image data (or divided image data of a predetermined size) at regular intervals and thus, it is necessary to arrange a buffer memory in an output unit (a spooler in a printer to transfer graphic data to a printing unit, a frame memory in a display, an input/output unit and the like). In recent years, output images are at a faster frame rate and in higher resolution in an image processing apparatus such as a printer and display (or other information processing apparatuses) that processes and outputs input image data. With output images at a faster frame rate or in higher resolution, the amount of data output per unit time increases, which also increases the capacity of the buffer memory.

To prevent an increasing size of the capacity of the buffer memory, the data transfer between chips may be made faster by using a connection/communication method having a data transfer rate close to the throughput of the output unit.

According to the method discussed in Japanese Patent Application Laid-Open No. 2008-112413, data transfer is performed between a data processing unit and an image memory access processing unit connected via peripheral component interconnect (PCI)-Express, which is a high-speed serial bus. According to Japanese Patent Application Laid-Open No. 2008-112413, instead of a read request to a memory from the data processing unit, data transfer is realized by sending a command to cause transfer of image data read by the image memory access unit from the memory for write processing.

According to the method discussed in Japanese Patent Application Laid-Open No. 11-188953, the size of data transfer is set so that data transfer can be performed by using isochronous transfer defined for IEEE1394, which is a high-speed serial bus.

However, according to the method discussed in Japanese Patent Application Laid-Open No. 2008-112413, it is necessary to consider a waiting time (latency) before the data processing unit actually starts to receive data after a data transfer request.

According to the method discussed in Japanese Patent Application Laid-Open No. 11-188953, there is no method of monitoring buffer conditions in the data output unit and it is necessary to secure a certain level of buffer amount. Moreover, the data transfer unit becomes relatively large in a transfer mode in which the transfer interval is relatively large so that it may be impossible to decrease the buffer size.

SUMMARY OF THE INVENTION

According to an aspect of the present invention, an information processing apparatus includes a buffer, an output unit configured to output data held in the buffer to an output device, and a transfer unit configured to transfer data held in a memory to a buffer of the output unit, wherein the transfer unit transfers the data held by the memory in a first mode in which data of an amount corresponding to a size of the buffer of the output unit is transferred and then, transfers the data held by the memory in a second mode in which data of an amount smaller than the size of the buffer of the output unit is transferred a plurality of times.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
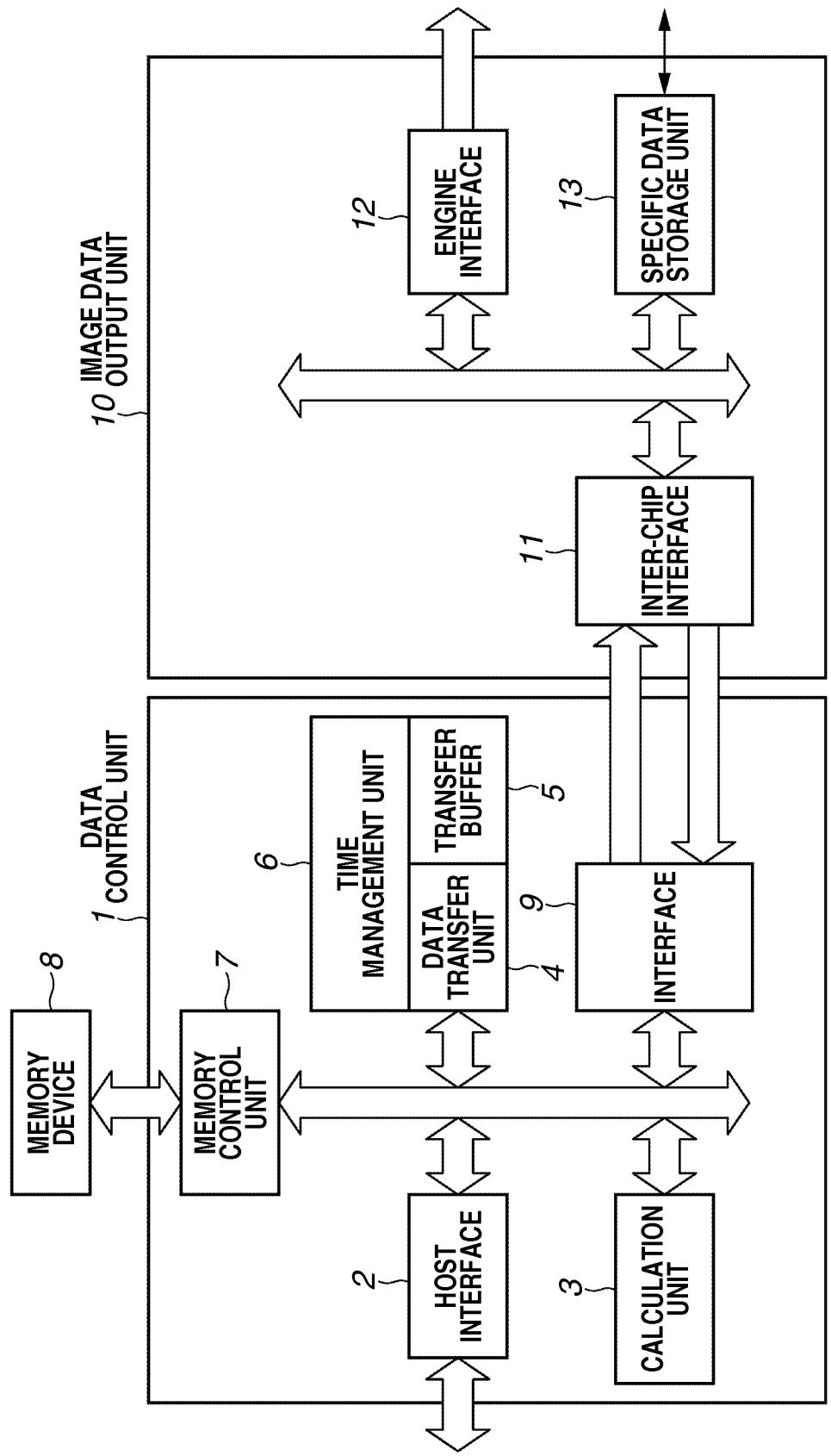
FIG. 1 illustrates an outline configuration of a printer system according to a first exemplary embodiment of the present invention.

FIG. 1 illustrates an overall outline of an information processing apparatus (printer) according to the first exemplary embodiment of the present invention.

In FIG. 1, a data control unit (control circuit) 1 receives and holds print data from a host computer (not illustrated). A host interface 2 performs communication with the host computer. A calculation unit 3 such as a central processing unit (CPU) controls the entire printer. A data transfer unit (DMAC unit) 4 performs data transfer through direct memory access (DMA) without involvement of the CPU. A transfer buffer 5 is used by the data transfer unit (DMAC unit) 4, and a time management unit 6 activates data transfer of the data transfer unit (DMAC unit) 4. The data control unit 1 includes a memory control unit 7, and an external memory device 8 is controlled by the memory control unit 7.

An interface 9 (inter-chip bus) is used for bus connection. An image data output unit (output circuit) 10 actually does printing. An inter-chip interface unit 11 is used for bus connection between chips of the image data output unit 10. An engine interface 12 outputs image data to a printing engine (not illustrated), and a specific data storage unit 13 stores engine specific data such as the buffer size of the engine interface 12 and the printing speed of the engine.

Figure 2:
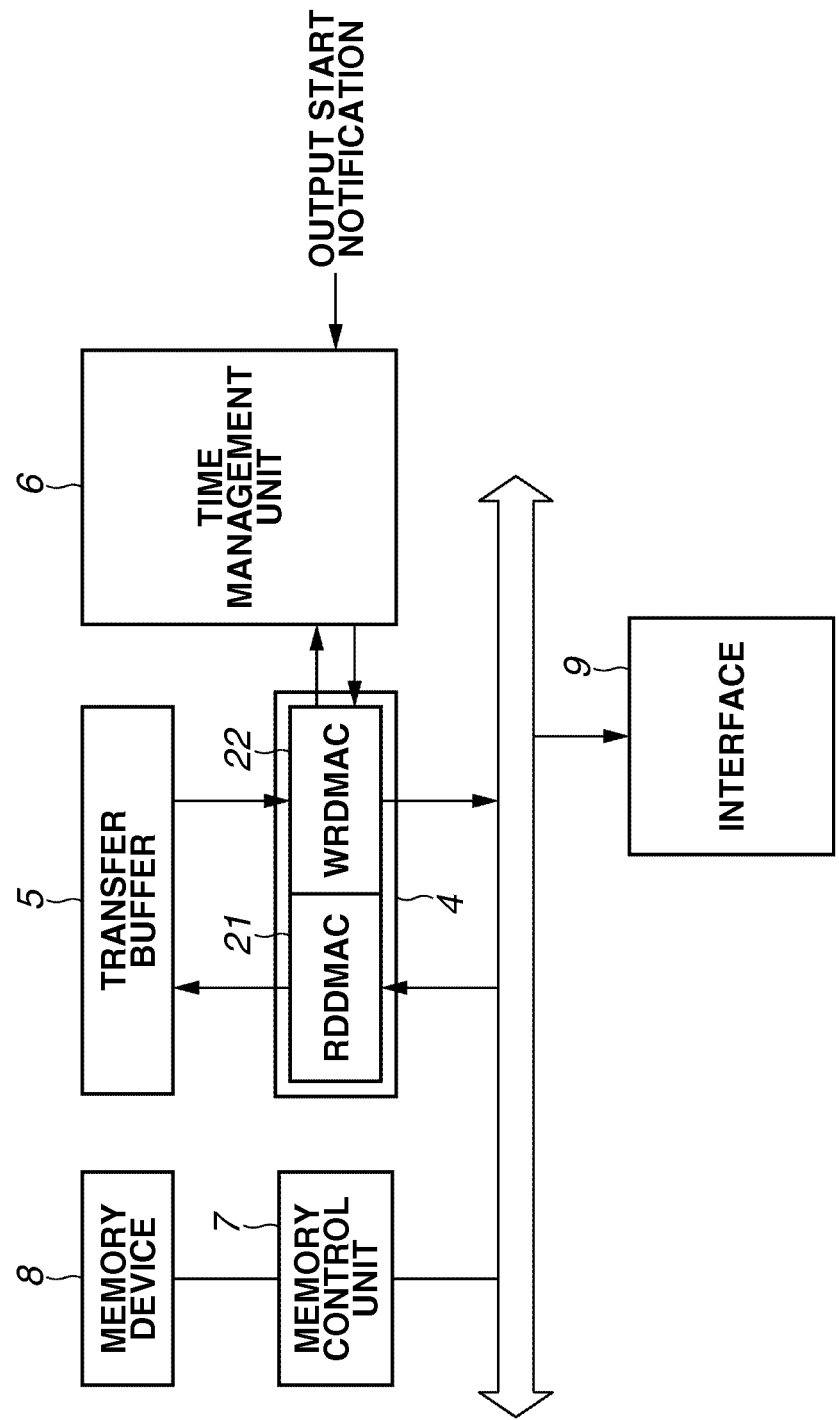
FIG. 2 illustrates a main configuration of a data control unit according to the first exemplary embodiment.

FIG. 2 is a block diagram illustrating details of a portion of the configuration of the data control unit 1 illustrated in FIG. 1. A Read DMAC (RDDMAC) 21 reads data from the memory 8 for the transfer buffer 5 and a Write DMAC (WRDMAC) 22 outputs data to the image data output unit 10 from the transfer buffer 5. Other structural elements are the same as described in FIG. 1 and the same reference numerals are attached as those in FIG. 1 and a description thereof will not be repeated.

Figure 3:
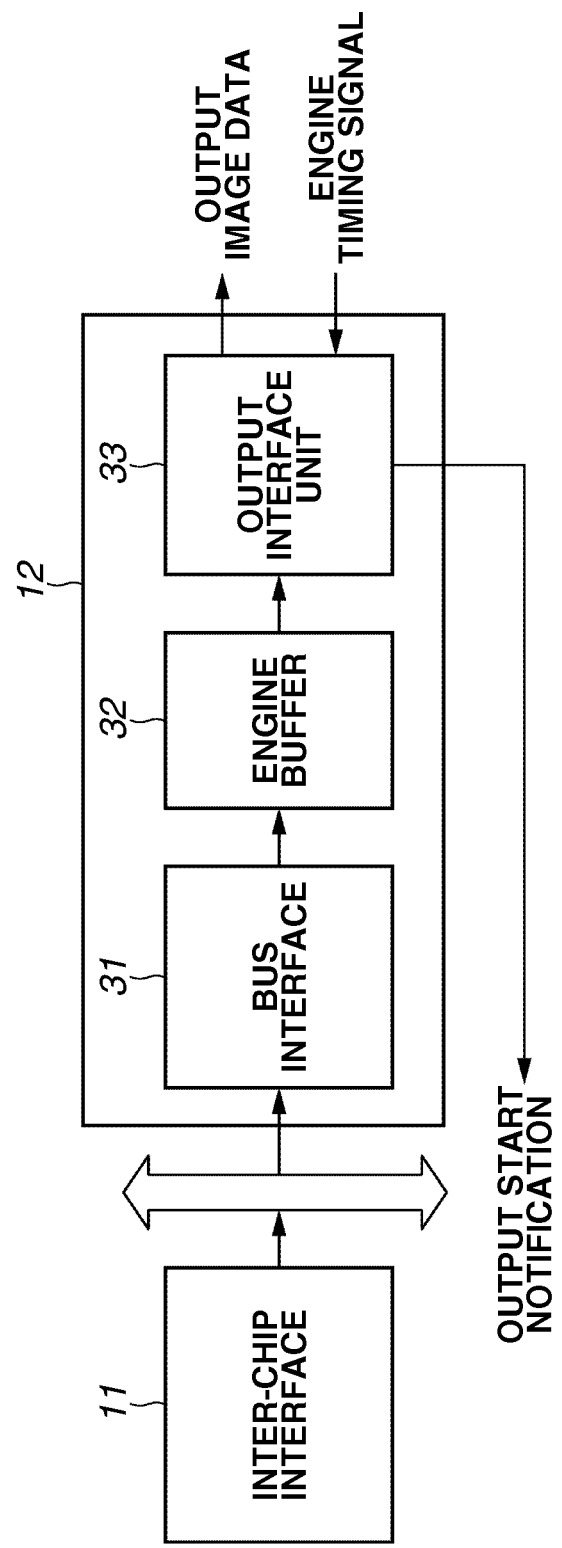
FIG. 3 illustrates the main configuration of an image data output unit according to the first exemplary embodiment.

On the other hand, FIG. 3 is a block diagram illustrating details of a portion of the configuration of the image data output unit 10 illustrated in FIG. 1. A bus interface 31, an output interface unit (engine buffer) 32, and an output interface unit 33 are inside a chip in the engine interface 12.

Figure 9:
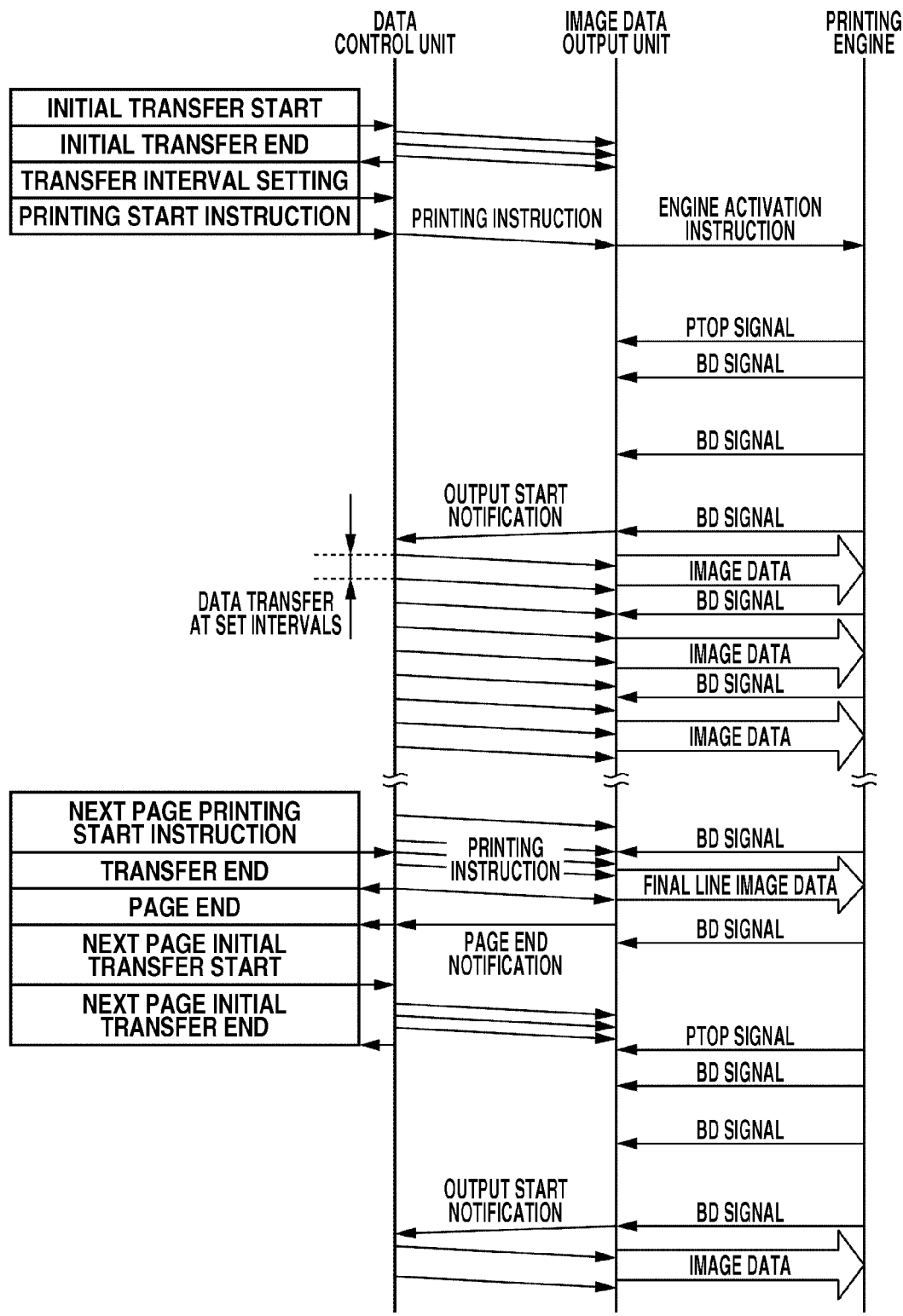
FIG. 9 is a sequence chart illustrating the timing of various signals for the printing operation according to the first exemplary embodiment.

An outline operation of the information processing apparatus illustrated in FIG. 1 will be described. FIG. 9 is a sequence diagram concerning data transfer processing to the printing engine (output device) by the information processing apparatus illustrated in FIG. 1.

When the data control unit 1 receives print data via the host interface 2 together with a print request from the host computer (not illustrated), the data control unit 1 stores image data to be printed contained in the received print data in the memory 8 via the memory control unit 7 (not illustrated in FIG. 9).

Then, the calculation unit 3 accesses the specific data storage unit 13 of the image data output unit 10 via the inter-chip interface units 9, 11 to acquire specific information such as the buffer amount of the engine interface 12 and the image output rate. Based on the acquired buffer amount of the engine interface 12, the calculation unit 3 determines the amount of data (the amount of data to fully occupy the engine buffer 32) to be transferred in the initial transfer (data transfer to fully occupy the engine buffer 32 before a print instruction by the data control unit) of image data. Then, the calculation unit 3 causes the DMAC unit 4 to transfer, of data to be printed, the amount of data to fully occupy the engine buffer 32. While the engine buffer 32 asserts a buffer full signal when the engine buffer 32 is full, the buffer full signal may be asserted when the buffer is almost full.

In the present exemplary embodiment, after the initial transfer to transfer data corresponding to the buffer size is performed in the first mode, main transfer to transfer data of an amount smaller than the buffer size a multiple number of times is performed in the second mode. A predetermined amount that occupies the buffer almost fully may be set for the initial transfer to transfer the predetermined amount of data.

The calculation unit 3 acquires a transfer interval (details thereof will be described below) C and sets the transfer interval to a register held by the time management unit 6. After the initial transfer and the setting of the transfer interval C, the calculation unit 3 outputs a print instruction to the engine interface 12 to start printing. After receiving the print instruction, the engine interface 12 activates a printing engine (details of the transfer interval will be described below).

The printing engine outputs a PTOP signal when a printing unit reaches a printing area of a page to be printed in a paper feeding direction and a BD signal when the printing unit reaches a position to start printing in a scanning direction (details of the printing operation will be described below).

When the printing unit reaches the printing position indicated by image data and the output interface unit 33 starts data output, the output interface unit 33 outputs an output start signal (StartP in FIG. 5) to the time management unit 6 of the data control unit 1.

Further, the output start signal is transferred to the engine buffer 32 in the initial transfer before starting the printing operation and the output interface unit 33 starts output starting with image data held in the engine buffer 32.

When the data control unit 1 is notified of the output start signal, the data control unit 1 performs main transfer of image data (the remaining image data after the initial transfer) to the image data output unit 10 based on the acquired output interval (details of the main transfer will be described below). Then, after transferring the last pixel of image data of the page being transferred, the image data output unit 10 notifies the data control unit 1 of the transfer end. In addition, if the print data has the following page, the initial transfer of the following page is similarly performed to acquire the transfer interval and, based on an output start notification, data is transferred based on the transfer interval.

In a system indicated by the sequence diagram in FIG. 9, a print instruction of the following page can be output in any timing when printing of the first page is done. The print instruction of the following page may be fitted to specifications of the printing engine or specifications of a printing system.

Next, processing to acquire the transfer interval C by the calculation unit 3 will be described.

The calculation unit 3 acquires the data transfer interval from the data transfer size of the DMAC unit 4 at a time, the image data output rate obtained by previously accessing the specific data storage unit 13, and the time resolution managed by the time management unit 6. If the image output rate (Pix/ns) including a blanking period in which no image is output from the data control unit 1 is DO, the number of images per byte is N (Pix/Byte), the data transfer amount at a time is M (Bytes), the period of a time management unit clock of the time management unit 6 is F (ns), and the transfer interval (initial count value) is C, the calculation equation is given as below:

$$C=(M*N/DO)/F$$

The memory 8 may be caused to store the transfer interval C calculated in advance based on DO, N, M, and F as a look-up table so that the calculation unit 3 can acquire the transfer interval C by referring to the look-up table. The data transfer amount M at a time is set to the DMAC unit 4 in advance and the data transfer amount M is in an integral ratio to the size of the DMA buffer (not illustrated) held by the WRDMAC. The image output rate is one of values acquired by the specific data holding unit in advance from external devices as values indicating performance of external devices.

By transferring data in the transfer interval C obtained from the above equation, the data transfer rate by the DMAC unit 4 and the output rate of the engine interface 12 can be brought closer while maintaining real-time properties of data output of the engine interface 12.

Next, the printing operation by the printing engine and the signal output by the printing engine to the image data output unit 10 will be described.

Figure 4:
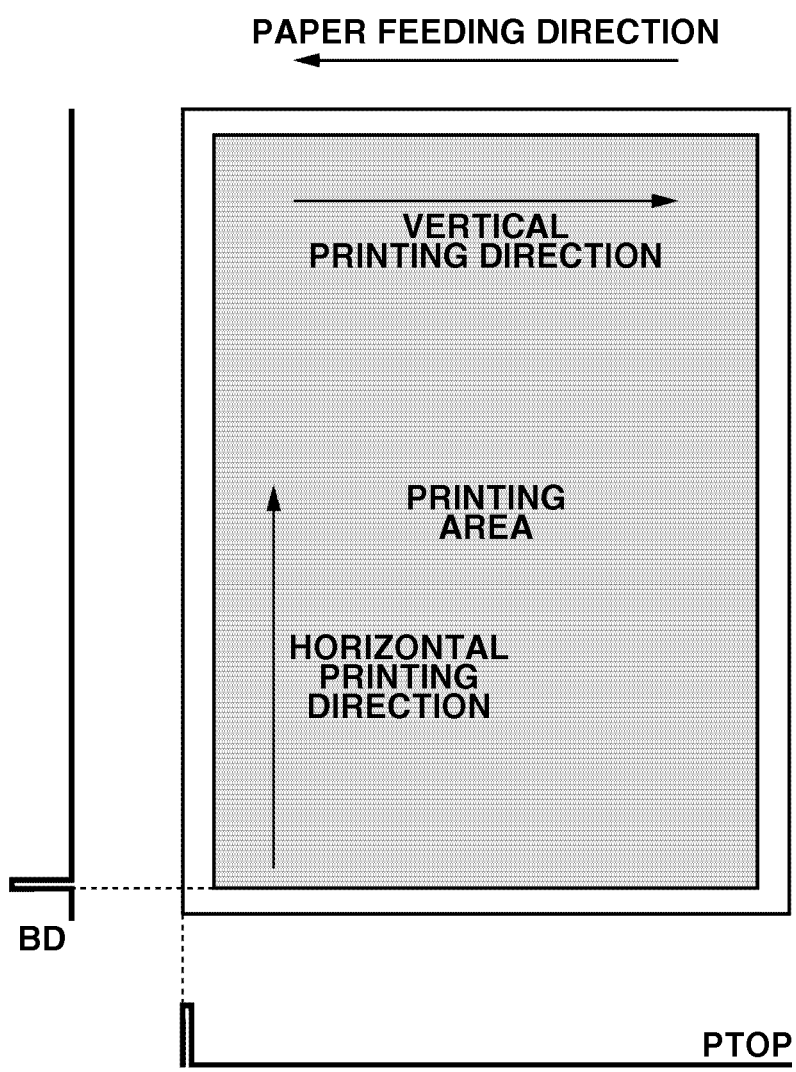
FIG. 4 illustrates a relationship between a printing operation and a signal according to the first exemplary embodiment.

After printing (printing one line) a portion designated as a printing area illustrated in FIG. 4 from upstream to downstream to the horizontal printing direction, the recording medium is conveyed in the paper feeding direction to print again from upstream to downstream to the horizontal printing direction. By repeating this, upstream corners to the vertical printing direction and the horizontal printing direction are first printed and up to downstream corners to the vertical printing direction and the horizontal printing direction are printed.

Figure 5:
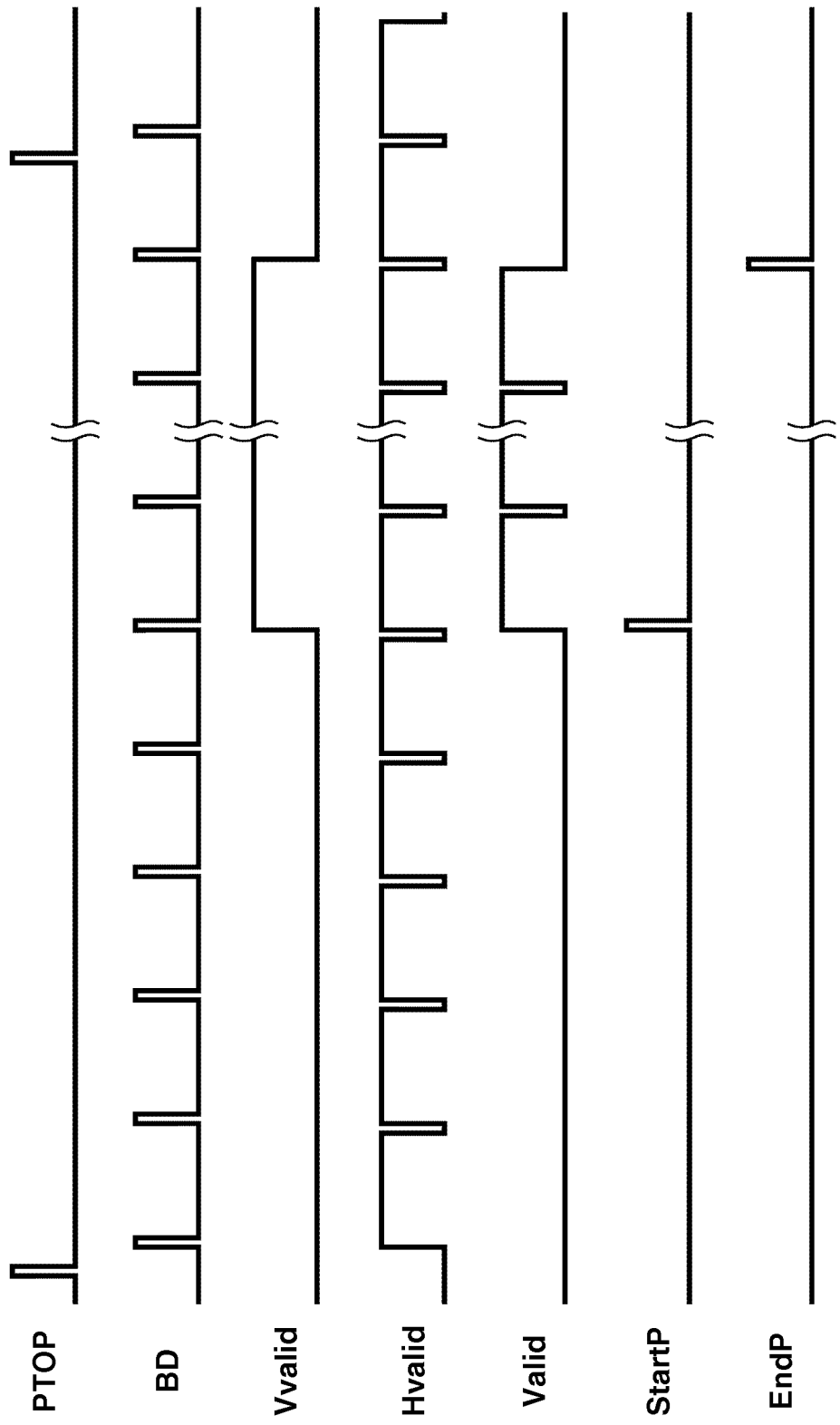
FIG. 5 illustrates timing of the signals of an engine interface according to the first exemplary embodiment.

A timing signal concerning the engine interface 12 when the printing operation is performed is illustrated in FIG. 5. First, a PAGE TOP signal (PTOP signal) indicating that the beginning of printing paper in the paper feeding direction (upstream edge of the printing area in the vertical printing direction) reaches the printing unit is input by the printing engine (not illustrated) as a timing signal. Next, a BEAM DETECT signal (BD signal) indicating that the printing unit starts scanning in the horizontal direction and the printing unit reaches the start position (upstream edge of the printing area in the horizontal printing direction) of the printing area is input by the printing engine (not illustrated). The BD signal is input each time when the printing unit starts printing of one line of the printing area.

Signals indicating a valid period in which image data is actually output are generated from these signals by the output interface unit 33 inside the engine interface 12 as Vvalid (vertical direction valid period signal), Hvalid (horizontal direction valid period signal), and a Valid signal indicating the valid image output period illustrated in FIG. 5. The Valid signal is generated by ANDing Vvalid and Hvalid signals. In FIG. 5, up to the first signal (PTOP, BD) of the second page is illustrated.

Figure 6:
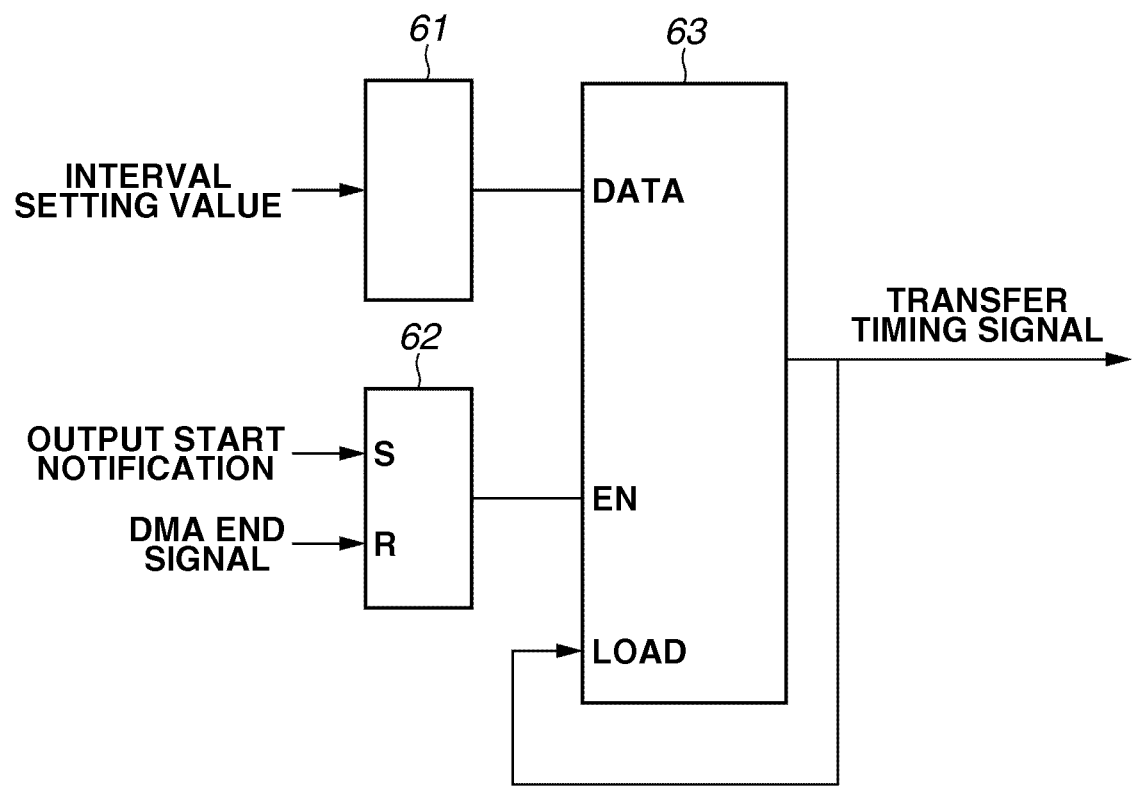
FIG. 6 illustrates the main configuration of a time management unit according to the first exemplary embodiment.
Figure 7:
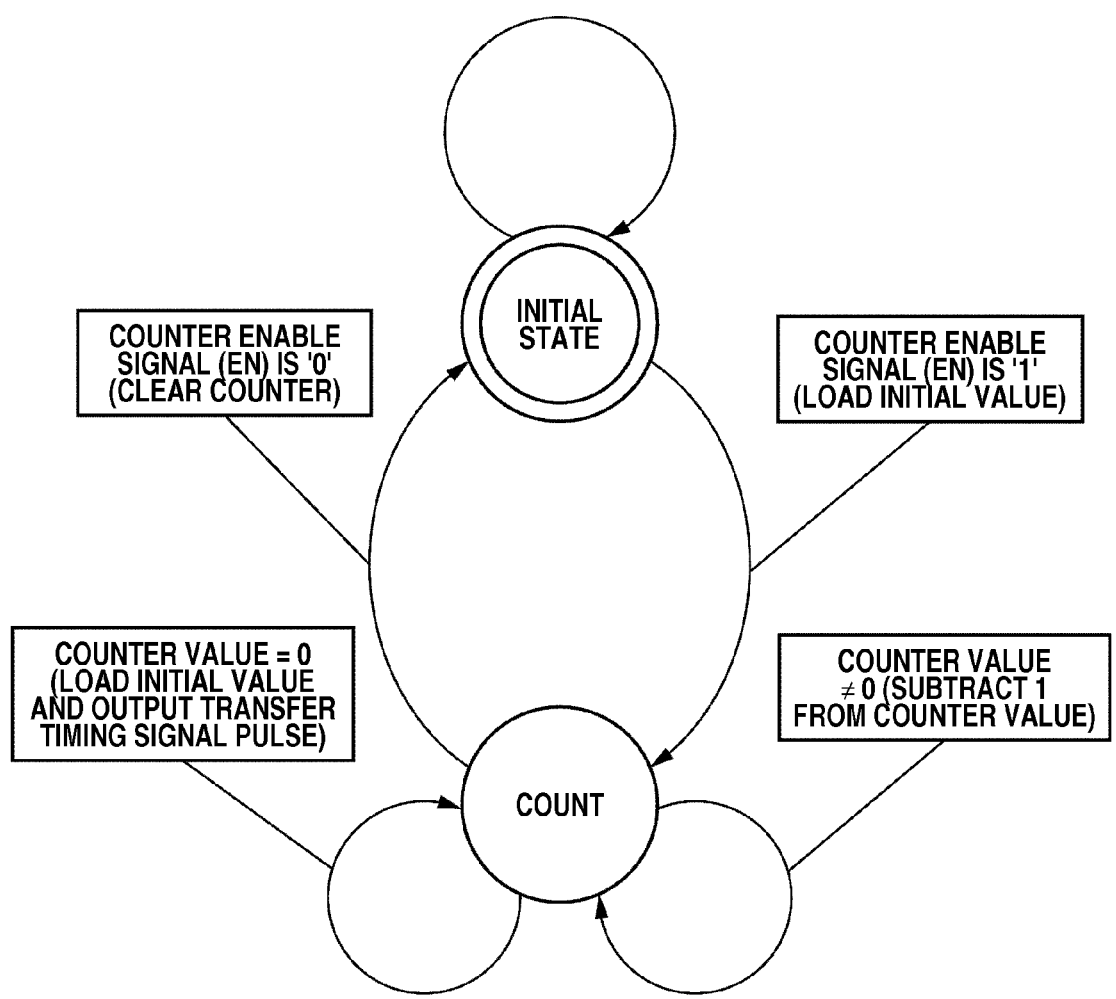
FIG. 7 illustrates a state transition diagram of a counter according to the first exemplary embodiment.

The time management unit 6 of the data control unit 1 is notified of the output start signal and the time management unit 6 starts measurement using the signal as a trigger. The configuration of the time management unit 6 is illustrated in FIG. 6. In FIG. 6, a register 61 sets the transfer period (initial count value) C acquired by the calculation unit 3. An SR flip-flop (Set/Reset type flip-flop) 62 generates a signal to enable a count operation of a counter. A down-counter 63 counts down from an initial value, and FIG. 7 illustrates a state transition diagram of the down-counter 63.

When the down-counter 63 is in the initial state, if the output start signal is input into the Set side of the SR flip-flop of the time management unit 6, the SR flip-flop outputs an EN signal (enable signal "1") to the down-counter 63 to activate the down-counter 63. With the activation, the down-counter loads the initial count value C (transfer period) from the register 61 and makes a transition to the count state to count down in each fixed period.

When the count value becomes 0, the down-counter 63 outputs a transfer timing signal. The transfer timing signal functions also as a LOAD signal for the down-counter 63 and fetches DATA (corresponding to the transfer period C) as an initial value to count down again.

If a DMA end signal (transfer end signal) is input into the Reset side of the SR flip-flop 62, the count value of the down-counter 63 is cleared to transition to the initial state by the EN signal (enable signal "0") of the down-counter 62 being cleared. The DMA end signal is supplied from the DMAC unit 4.

Figure 8:
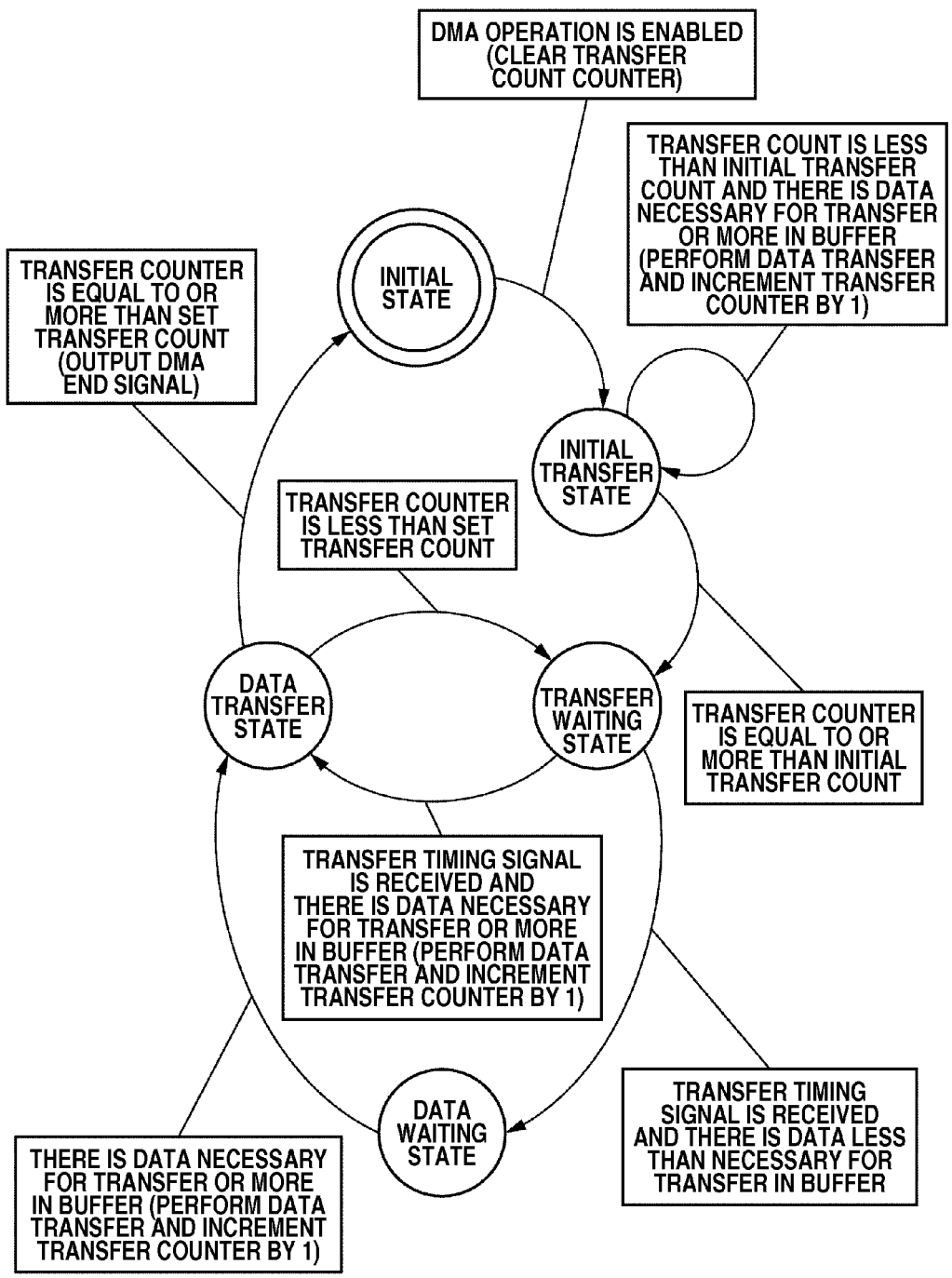
FIG. 8 illustrates a state transition diagram of WRDMAC according to the first exemplary embodiment.

As illustrated in FIG. 2, the DMAC unit 4 includes the RDDMAC unit 21 and the WRDMAC unit 22. The RDDMAC unit 21 of these has a common DMAC function and, if there is free space in the transfer buffer 5, fetches data from the memory 8 via the memory control unit 7 and writes the fetched data into the transfer buffer 5. On the other hand, the WRDMAC 22 includes registers (not illustrated) to hold the transfer destination address, initial transfer count, and total transfer count and a counter (not illustrated) to count the transfer count. FIG. 8 illustrates a state transition diagram of the WRDMAC unit 22.

In FIG. 8, the WRDMAC unit 22 in the initial state receives a DMA transfer instruction from the calculation unit 3 and clears the transfer count counter of the WRDMAC unit 22 to 0 before entering the initial transfer state.

In the initial transfer state, the WRDMAC unit 22 compares the value of the transfer count counter and the initial transfer count set by the calculation unit 3 and, if the value of the transfer count counter reaches the initial transfer count, enters the transfer waiting state. On the other hand, if the value of the transfer count counter is less than the initial transfer count and the transfer buffer 5 holds data of the amount necessary for transfer at a time (corresponding to data of the transfer size at a time or more), the WRDMAC unit 22 performs data transfer and counts up (increments) the value of the transfer count counter by 1.

The transfer waiting state continues until the transfer timing signal from the time management unit 6 becomes 1 and when the transfer timing signal becomes 1, if the transfer buffer 5 holds data of the amount necessary for data transfer at a time, the WRDMAC unit 22 enters the data transfer state. At this point, the WRDMAC unit 22 performs data transfer and at the same time, counts up the transfer count counter by 1. On the other hand, if the transfer buffer 5 does not hold data of the amount necessary for data transfer at a time, the WRDMAC unit 22 enters the data waiting state.

In the data waiting state, the accumulation of data of the amount necessary for data transfer is awaited in the buffer and when data of the amount necessary for data transfer is accumulated, the WRDMAC unit 22 performs data transfer, counts up the value of the transfer counter by 1, and enters the data transfer state. Incidentally, if there is free space in the transfer buffer 5, the RDDMAC unit 21 fetches data from the memory 8 and thus, the RDDMAC unit 21 has no data waiting state like the WRDMAC state 22.

The WRDMAC unit 22 checks the value of the transfer count counter in the data transfer state and if the value of the transfer counter reaches the value set as the total transfer count, the WRDMAC unit 22 outputs a DMA end signal and returns to the initial state. On the other hand, if the value of the transfer counter has not reached the total transfer count, the WRDMAC unit 22 enters the transfer waiting state in preparation for the following transfer.

The transferred data is held by the engine buffer 32 via the inter-chip interfaces 9, 11 and the bus interface 31.

Before printing is started, the output interface unit 33 has the number of horizontal pixels and the number of vertical direction lines of an output image set by the calculation unit 3. After the final image data determined from the number of horizontal pixels×the number of vertical direction lines is output, the output interface unit 33 outputs a page end notification (EndP in FIG. 5) notifying the data control unit 1 that output of data for one page is completed.

When page printing is done continuously, the data control unit 1 starts the initial transfer of the second page by using the page end notification notified from the image data output unit 10 as a trigger and like in the first page, and waits for a data output start notification of the second page before performing the data transfer.

Figure 10:
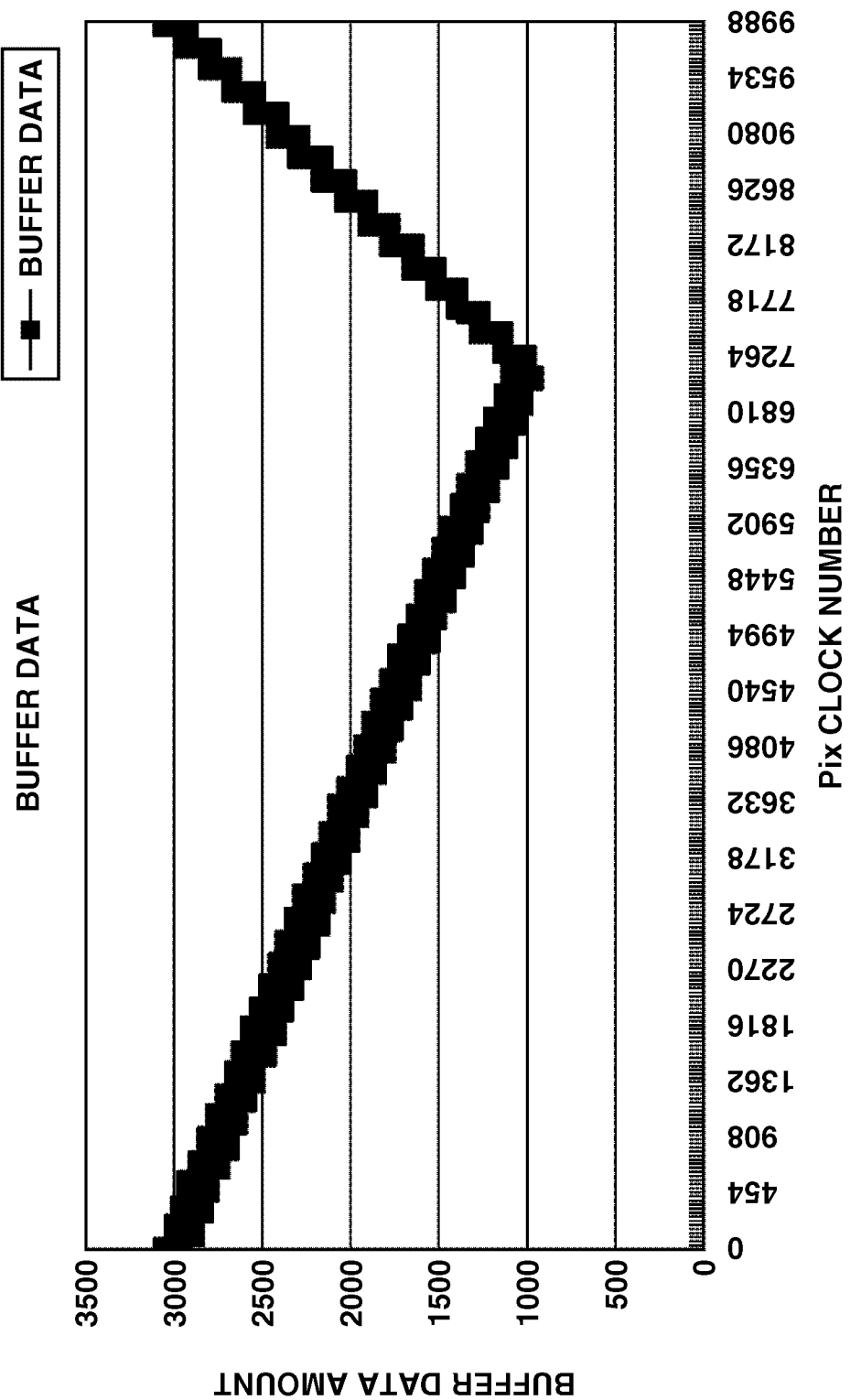
FIG. 10 illustrates changes in amount of data held by an engine buffer when image data for one line is transferred.

If the main transfer is performed as described above, changes in amount of data in the engine buffer 32 when data transfer for one line is performed in the main transfer are illustrated in FIG. 10.

In FIG. 10, the vertical axis represents the amount of data (Pixel unit) held by the engine buffer 32 and the horizontal axis represents the time (Pixel clock unit). In FIG. 10, one line period is set to 10000 Pixel clock, the valid printing period is set to 7200 Pixel clock, and time 0 is set as the start timing of the valid printing period for illustration.

Based on the maximum data amount (about 3000) and the minimum data amount (about 1000) in one line period, it is understood that the engine buffer 32 needs a size to hold the data amount for the difference (about 2000). When the data amount is compared with the valid data amount (7200) in one line period as illustrated in FIG. 10, the data amount has a size smaller than the data amount for one line.

Therefore, the buffer size can be reduced by the present exemplary embodiment.

In the present exemplary embodiment, a configuration in which image data of one color is transferred and printed is used for the description for the sake of simplicity, but when a plurality of colors is output, transfer processing may be performed independently for image data of each color.

The output start notification and output end notification sent from the image data output unit 10 to the data control unit 1 may be communicated by the inter-chip interfaces 9, 11 or other dedicated terminals (not illustrated). The register of the WRDMAC unit 22 may be caused to store the total transfer size, instead of the total transfer count. In such a case, the size of data to be transferred may be set to the down-counter 63 in advance to reduce the amount of transferred data from the down-counter each time the WRDMAC performs data transfer to the engine buffer 32. The DMAC unit 4 is caused to perform the initial transfer, but the calculation unit 3 may perform the initial transfer by software.

A form in which the capacity of the engine buffer is further reduced when compared with the first exemplary embodiment will be described as a second exemplary embodiment.

The outline configuration of the present exemplary embodiment is similar to the configuration illustrated in FIG. 1 and the same reference numerals are attached to structural elements that are functionally similar in other drawings and a description thereof will not be repeated.

Figure 11:
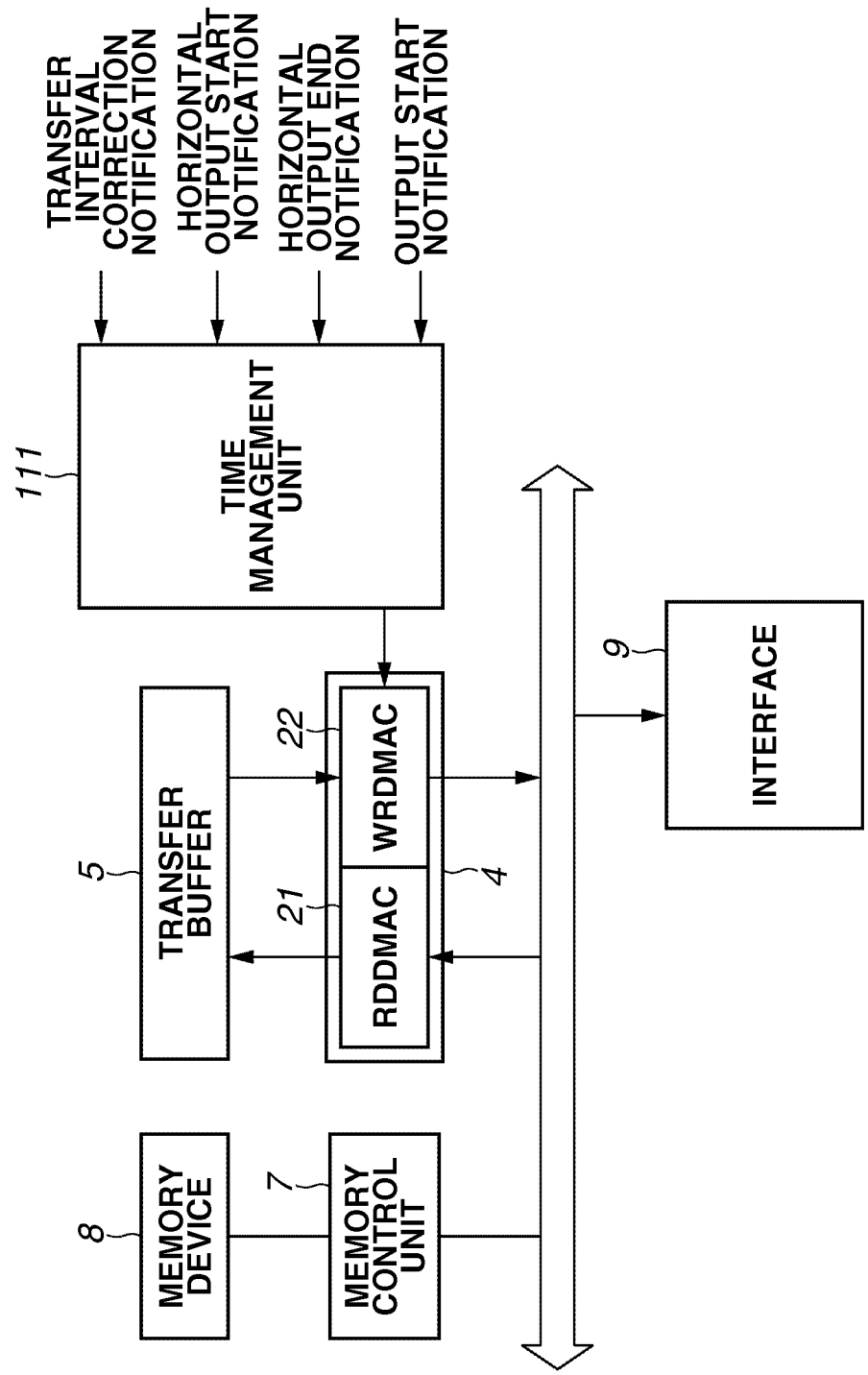
FIG. 11 illustrates the main configuration of the data control unit according to a second exemplary embodiment of the present invention.

A time management unit 111 illustrated in FIG. 11 activates data transfer of DMA. A monitor unit 112 illustrated in FIG. 12 monitors the data amount held by the engine buffer 32 and if the monitored data amount is above or below a preset reference value for a predetermined period, notifies the data control unit 1 to that effect. An output interface unit 113 has, in addition to the function of the output interface unit 33 in the first exemplary embodiment, a function to make a notification of the printing start timing (horizontal output start) or end timing (horizontal output end) in the horizontal direction and information to correct the transfer interval (transfer interval correction).

Figure 13:
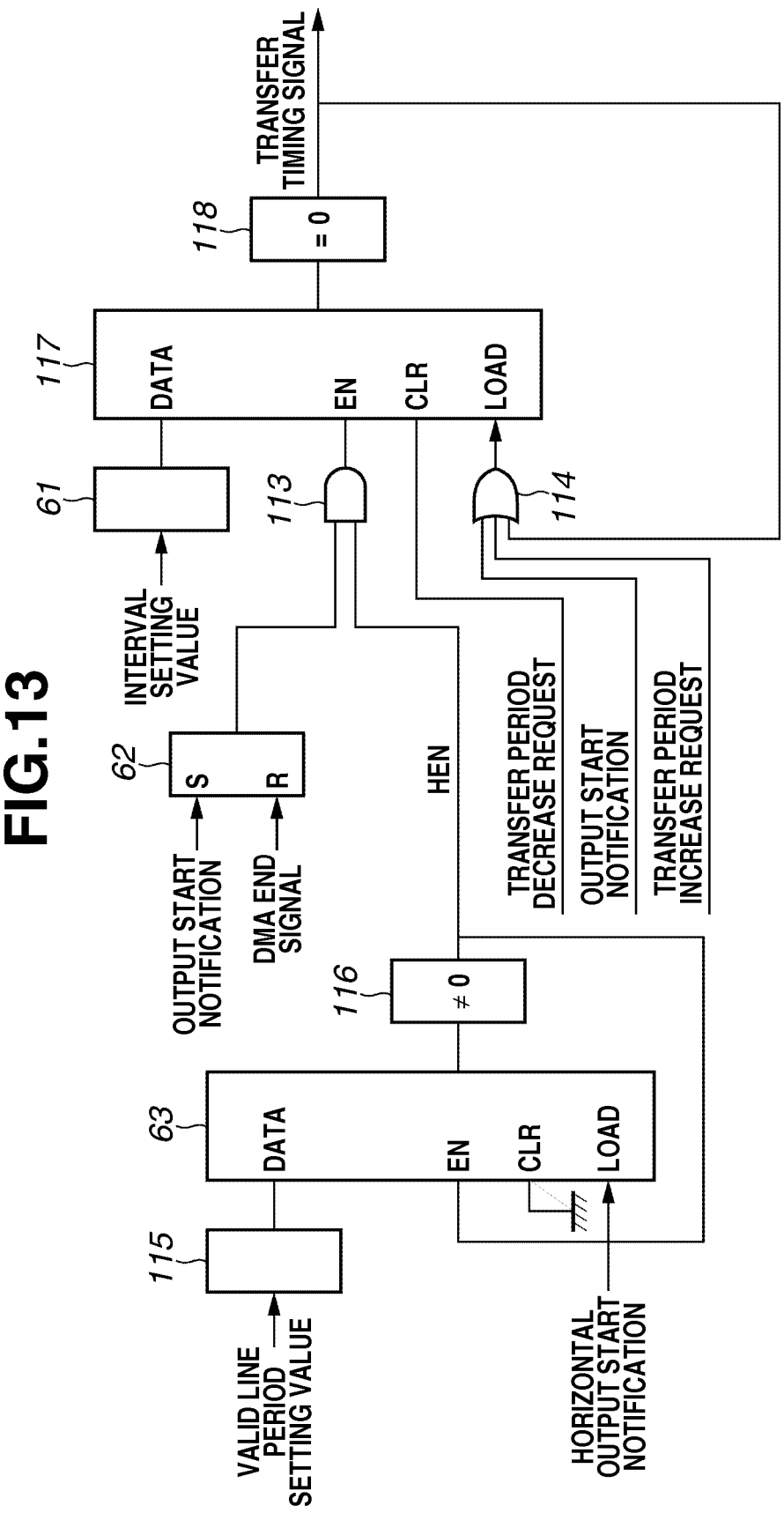
FIG. 13 illustrates the configuration of the time management unit according to the second exemplary embodiment.

FIG. 13 illustrates the configuration of the time management unit 111. In FIG. 13, the time management unit 111 includes an AND circuit (logical product arithmetic circuit) 113, an OR circuit (logical sum arithmetic circuit) 114, and a register 115 holding a value that represents the valid line period of image output by the clock of the time management unit. A comparator circuit 116 checks whether the output of the down-counter 63 is "0". In the present exemplary embodiment, the comparator circuit 116 outputs "0" if the output of the down-counter 63 is "0" and "1" if the output of the down-counter 63 is not "0". A comparator circuit 118 checks whether the output of a down-counter 117 is "0". In the present exemplary embodiment, the comparator circuit 118 outputs "1" if the output of the down-counter 63 is "0" and "0" if the output of the down-counter 63 is not "0".

Figure 14:
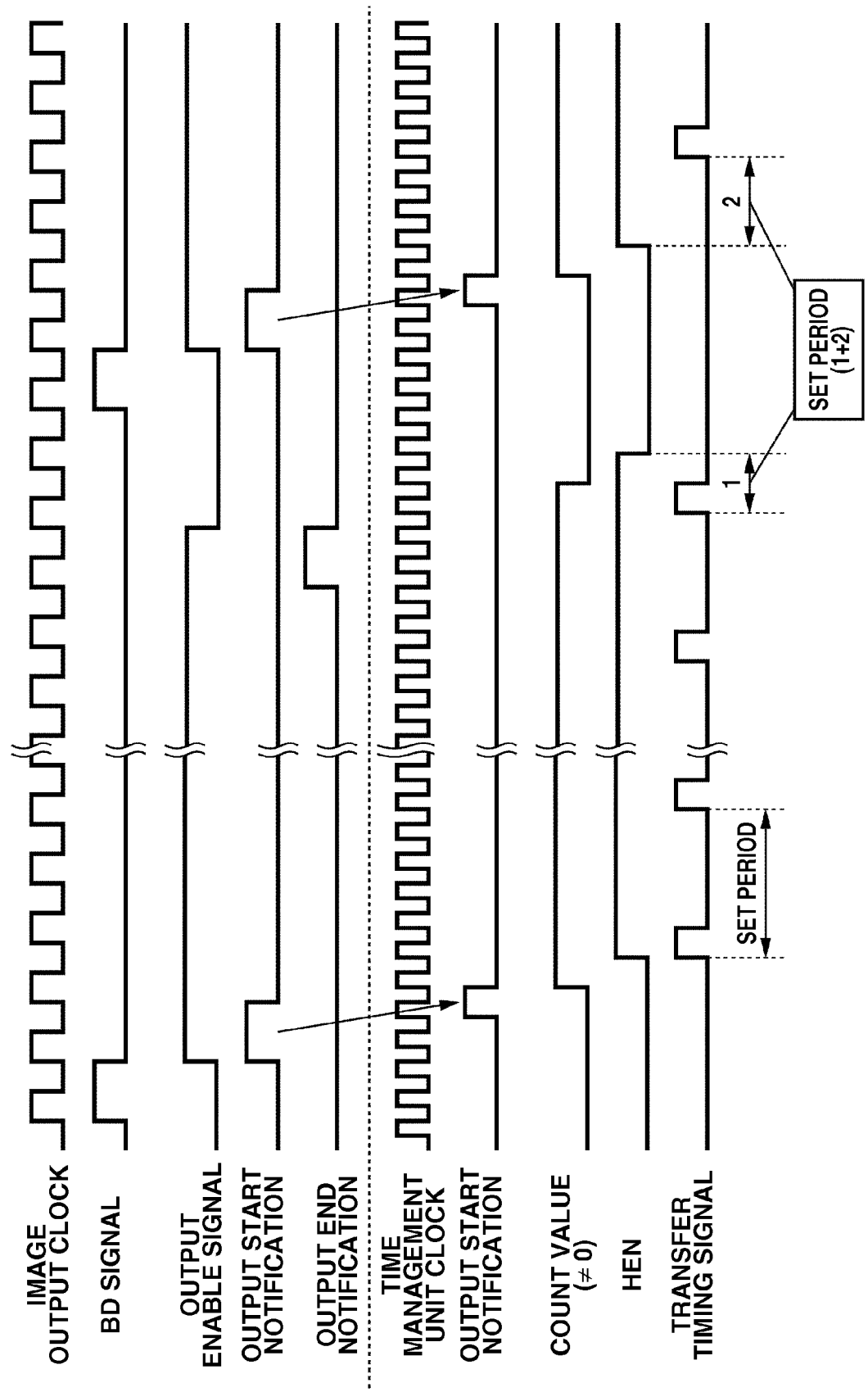
FIG. 14 is a timing chart illustrating the timing of signals handled by the image data output unit and the data control unit according to the second exemplary embodiment.

FIG. 14 illustrates a timing chart of a transfer timing signal instructing the WRDMAC 22 to perform data transfer. It is assumed in FIG. 14 that various notification signals from the image data output unit 10 are notified by using inter-chip interfaces. In FIG. 14, up to a first portion of the following line is illustrated so that the timing of each signal when an image for a plurality of lines is output can be understood.

Signals for the image data output unit 10 are illustrated in an upper part (above a dotted line) of FIG. 14 and signals for the data control unit 1 are illustrated in a lower part.

An image output clock is a clock signal received by the image data output unit 10 and each unit of the image data output unit 10 operates in synchronization with the image output clock. The BD signal is a signal received by the image data output unit 10 from the printing engine, and an output enable signal, the output start notification, and the output end notification are signals sent to the data control unit 1 by the image data output unit 10.

A time management unit clock is a clock signal received by the time management unit 111, and each unit of the time management unit 111 operates in synchronization with the time management unit clock. The output start notification is a signal received from the image data output unit 10, and a count value and an HEN transfer timing signal are signals output by the time management unit 111.

As illustrated in FIG. 14, when the BD signal is received from the printing engine, the image data output unit 10 outputs the output start notification to notify the data control unit 1 that data output has started. Further, the image data output unit 10 creates an internal signal "output enable signal" to enable output of image data to the printing engine and starts image data output.

Figure 12:
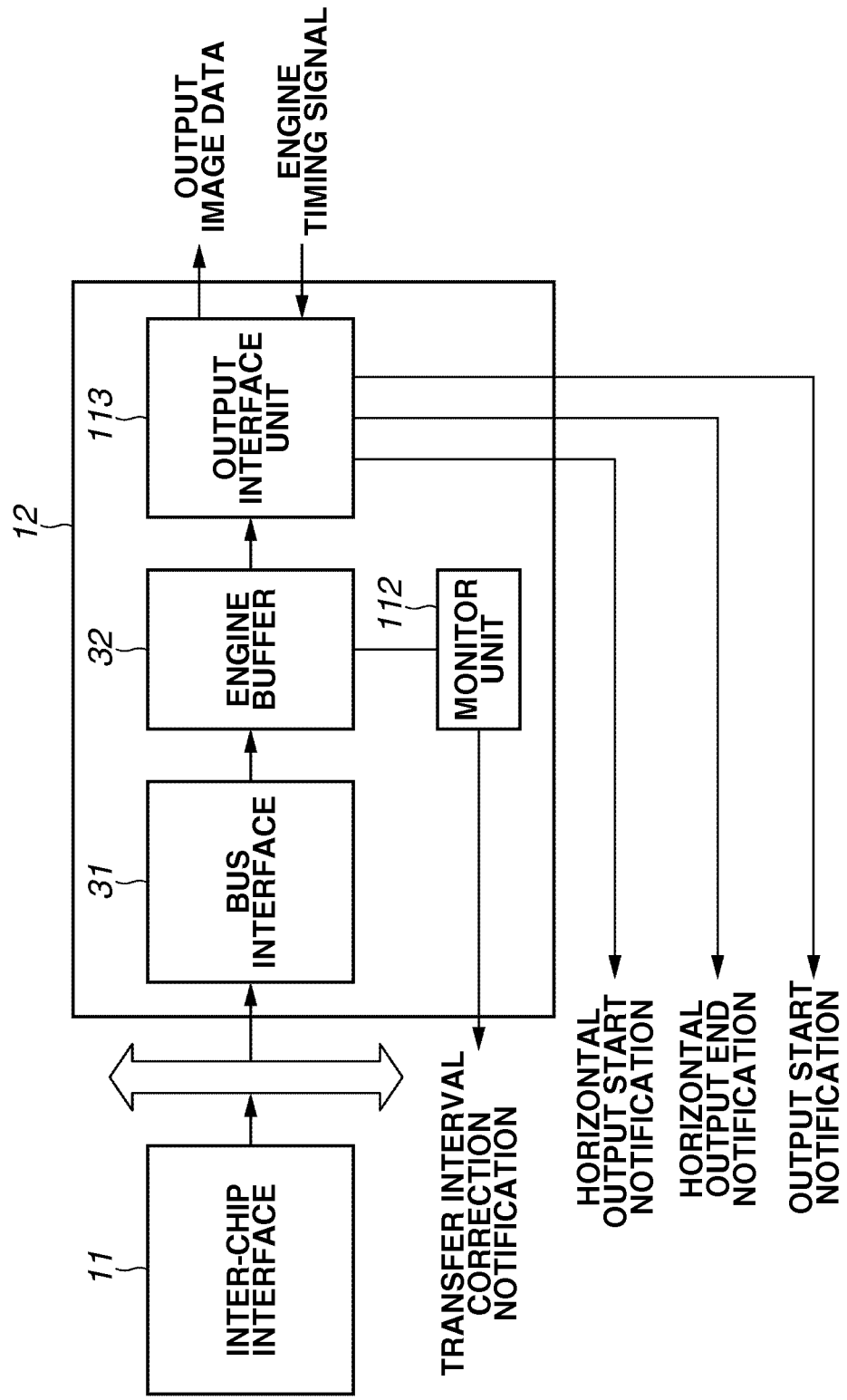
FIG. 12 illustrates the main configuration of the image data output unit according to the second exemplary embodiment.
Figure 18:
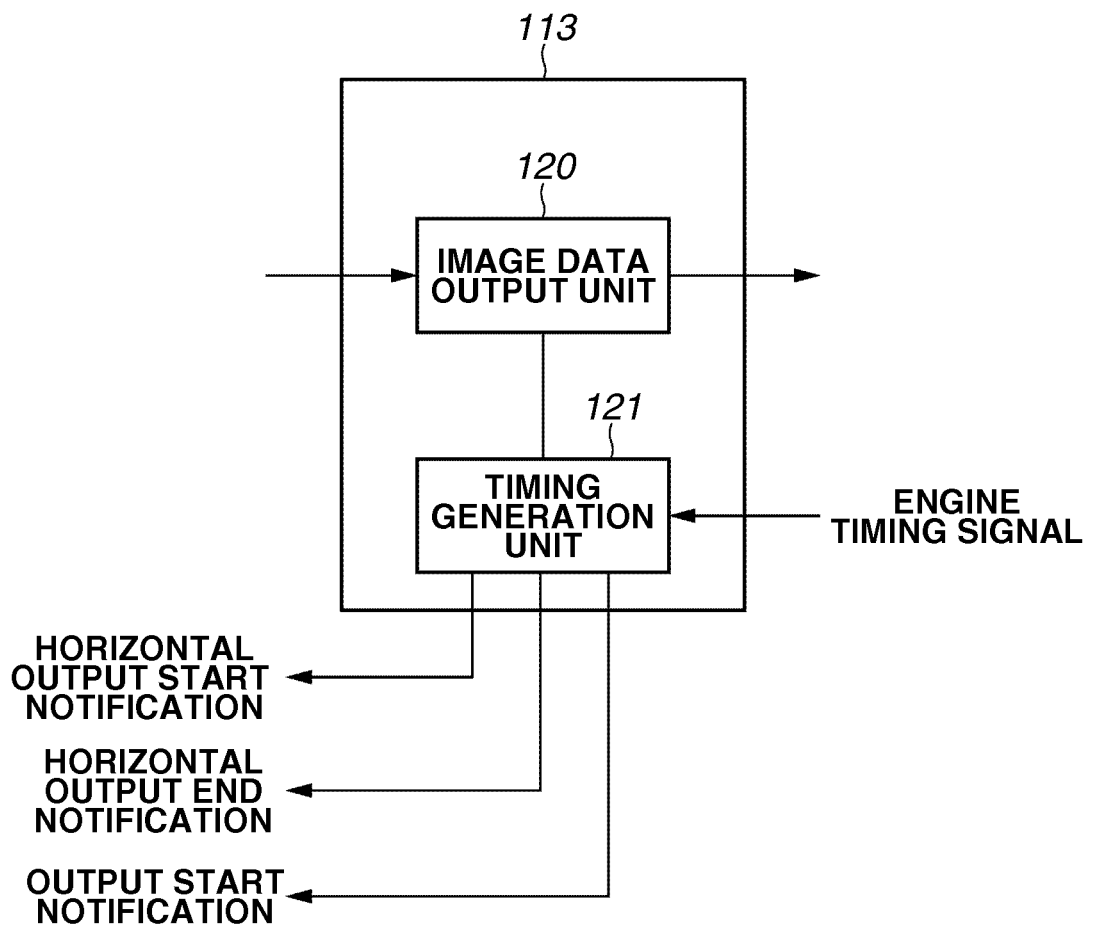
FIG. 18 illustrates an outline of an output interface according to the second exemplary embodiment.

The output enable signal is the signal Valid indicating the valid image output period illustrated in FIG. 5, and this signal is generated by a timing generation unit (121) inside the output interface unit 113 based on a timing signal input into the output interface unit 113 from the printing engine (not illustrated) inside the output interface unit 113 in FIG. 12 and supplied to an image data output unit (120) contained similarly in the output interface unit 113 (see FIG. 18).

The image data output unit 10 has the number of pieces of image data for one line to be output by the image data output unit 10 (corresponding to the number of pixels for one line) set by the data control unit 1 in advance. The image data output unit 10 counts the period in which the output enable signal is '1 (valid)' and if the count value reaches the value indicating the set number of pieces of image data for one line, sets the output enable signal to '0 (invalid)' and also outputs the output end notification to the data control unit 1.

Next, the operation to generate a horizontal valid period signal (HEN: Horizontal ENable in FIG. 14) used by the data control unit 1 will be described. A notification from the image data output unit 10 is transferred to the time management unit 111 via the inter-chip interfaces 9, 11 and input as a signal of one pulse width in the time management unit clock of the time management unit 111. Since the output start notification is input to the Set side of the SR flip-flop 62 of the time management unit 111 in FIG. 14 (no DMA end signal is input), the output of the SR flip-flop 62 in FIG. 13 is '1'.

The setting value indicating one line period is stored in the register 115 in advance by the calculation unit 3 and the register 115 loads the setting value into the down-counter 63 in the initial state (1501 in FIG. 15) in the following period (period in the time management unit clock) after the output start notification is made (the signal is asserted to be "1"). When the setting value is loaded into the down-counter 63, the down-counter counts down until the count value reaches 0 in synchronization with the time management unit clock (1502 in FIG. 15). At this point, the output from the down-counter 63 is not "0" and thus, the comparator circuit 116 outputs "1". Then, when the count value of the down-counter 63 becomes 0, the output of the comparator circuit 116 becomes '0'. The output of the comparator circuit 116 is input into the AND circuit 113 as a horizontal valid period signal (HEN). Therefore, the output of the comparator circuit 116 is '1' in a period indicated by the valid line period setting value.

The calculation unit 3 sets the value indicating the period in which the output interface 113 outputs image data for one line to the time management unit 111 as a valid line period setting value. The valid line period setting value is uniquely determined based on the ratio of the image output clock of the output interface 113 to the time management unit clock of the time management unit 111 and the number of pixels of the output image data in the horizontal direction. The other input (input from the SR flip-flop 62) of the AND circuit 113 becomes '1' after the output start notification is input into the time management unit 111 (until the DMA transfer end is input). If the input from the SR flip-flop 62 is '1', the input on the EN (Enable) side of the down-counter 117 in the latter stage is '1' while HEN is '1'.

Figure 15:
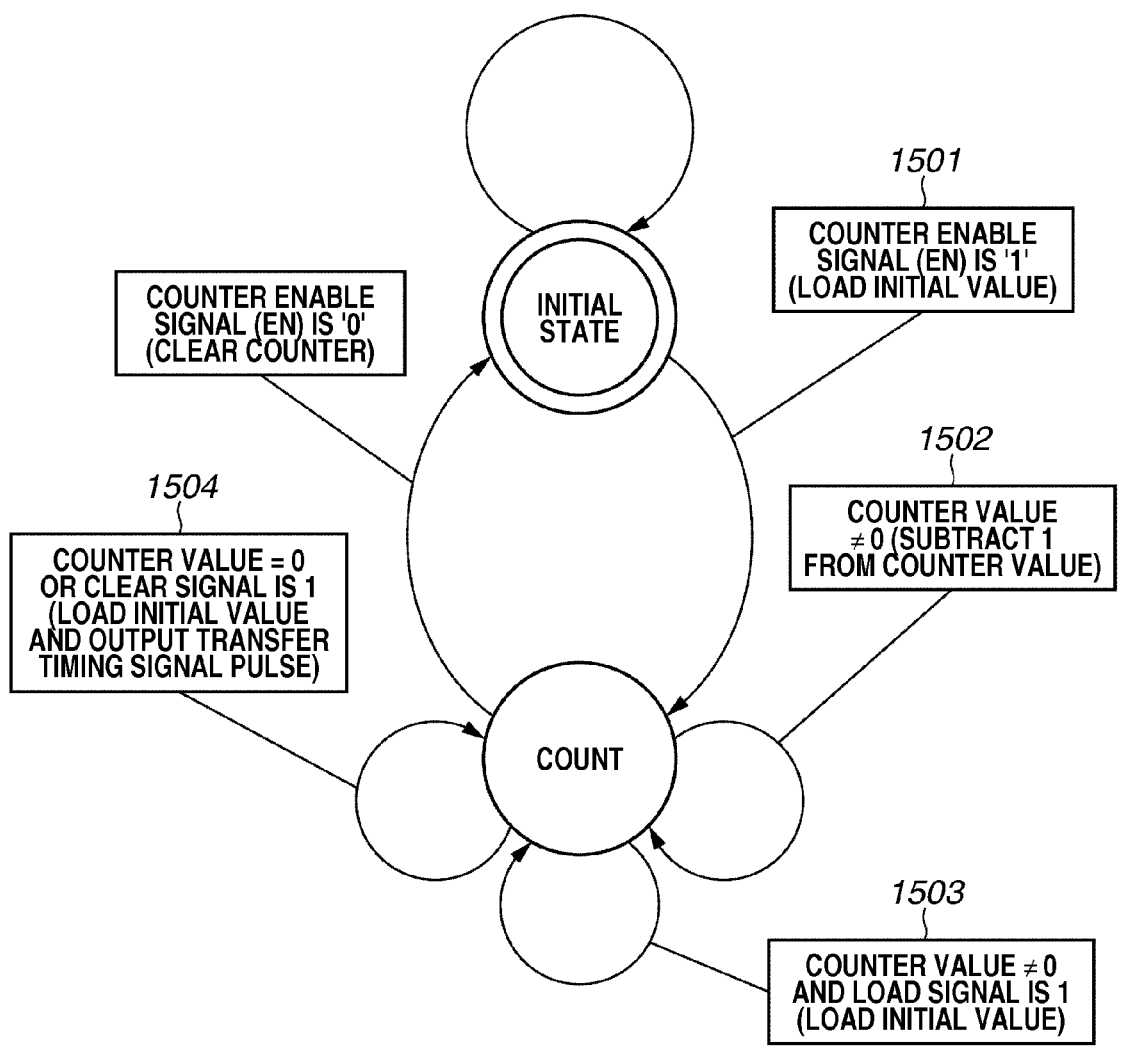
FIG. 15 illustrates a state transition diagram of the counter according to the second exemplary embodiment.

In the period in which the input of the EN signal into the down-counter 117 is '1', the comparator circuit 118 outputs a transfer timing signal at intervals set as the transfer interval C (each time the output of the down-counter 117 becomes "0") (1504 in FIG. 15). If the input of HEN on the EN side is '0', the down-counter 117 stops the count operation (third mode). In the example in FIG. 13, the horizontal output end notification is illustrated as an end time (time point of change from '1' to '0') of the horizontal valid period signal (HEN) in the time management unit 111.

The transfer timing signal is not line-synchronized. That is, while the data control unit assumes that the image data output unit is transferring data for one line, data transfer is performed at predetermined intervals based on the transfer timing signal, but if the data control unit assumes that the image data output unit has completed the transfer of data for one line, control by the transfer timing signal is stopped. This is because the printing unit is positioned downstream in the horizontal printing direction when data for one line is output and does not output data output from the image data output unit 10 while the printing unit is brought back to the upstream side in the horizontal printing direction to output data of the following line. The data transfer for one line is interrupted until the following BD signal is issued. Accordingly, the interval between lines is made longer than the interval (a transfer interval CR described below) managed by the time management unit 111. If, as described below, the input of the down-counter 117 on the LOAD side is asserted (the counter value is not 0 and the input on the LOAD side is '1'), the initial value is loaded into the counter and starts the count-down starting in the following clock (1503 in FIG. 15).

Figure 19:
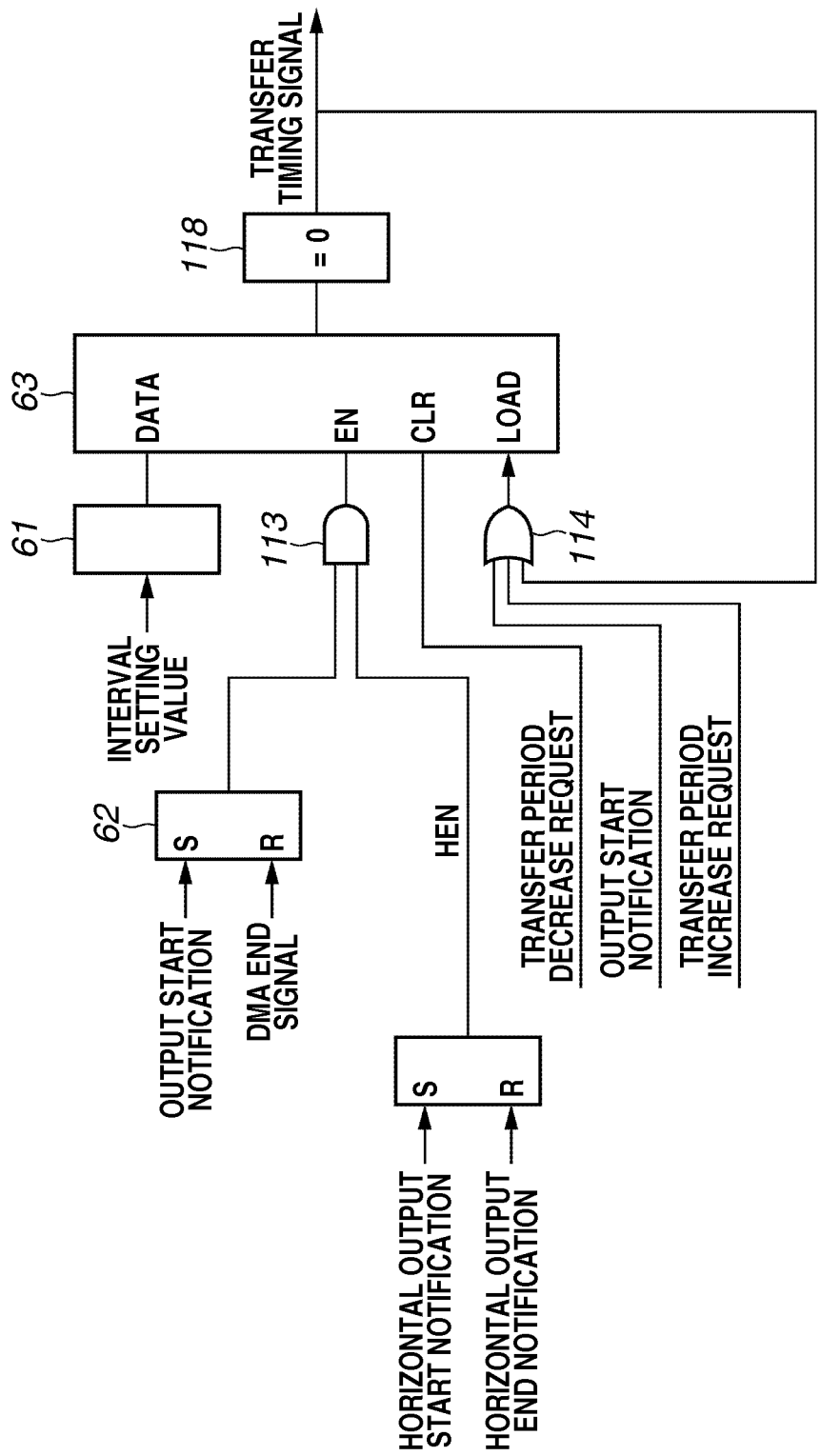
FIG. 19 illustrates the configuration of the time management unit according to the second exemplary embodiment.

The calculation unit 3 sets the period (transfer period) in which the valid image output period signal (HEN) in the horizontal direction is output to the register 115. The setting value indicating the period in which the HEN signal is output is determined based on the ratio of the clock of the output interface 113 to the clock of the time management unit 111 and the number of pixels of an output image in the horizontal direction from the horizontal output start notification supplied from the image output unit. As illustrated in FIG. 19, instead of setting the period in which the HEN signal is output to the register 115, a HEN signal may be configured by using the horizontal output start notification and horizontal output end notification supplied from the output interface 113.

The transfer interval CR set to the time management unit 111 is calculated by the equation shown below. If the image output rate (Pix/ns) of the valid period excluding the blanking period is DOR, the number of pixels per byte is N (Pix/Byte), the data transfer amount at a time is M (Byte), the period of the time management unit clock of the time management unit 111 is F (ns), and the count value of the transfer interval is CR, CR is calculated as follows:

$$CR=(M*N/DOR)/F$$

Next, execution of the generation and correction of a transfer interval correction notification will be described.

In the second exemplary embodiment, it may be difficult to align the output rate of the output interface unit 113 and the output rate determined from the clock rates (the clock period of the time management unit 111 and the period of the system clock) of the data control unit 1. If the transfer rate of the data control unit 1 is lower than the output rate of the engine of the image data output unit, the data amount held in the engine buffer 32 changes like a graph illustrated in FIG. 16.

Figure 16:
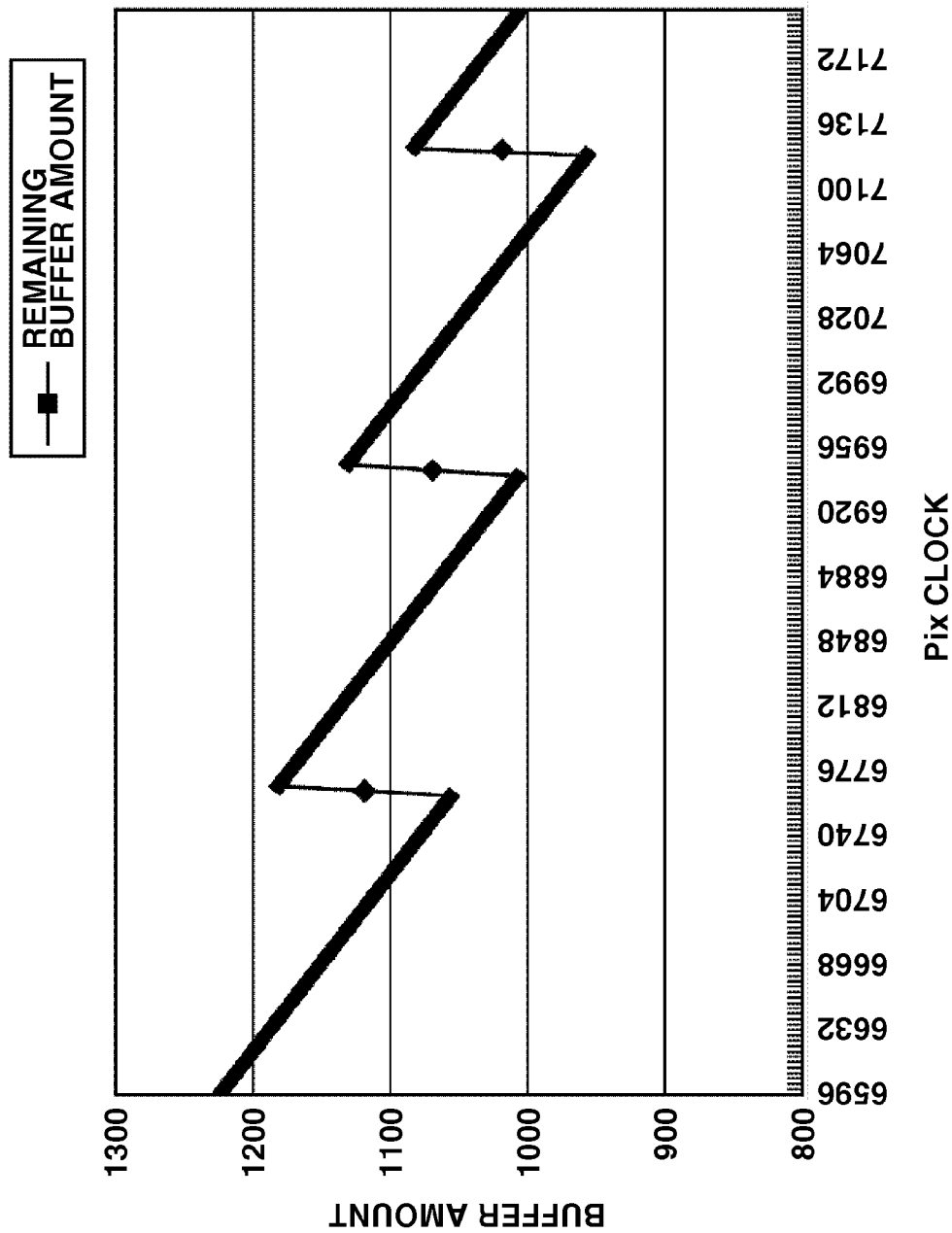
FIG. 16 illustrates changes in amount of data held by the engine buffer when image data for one line is transferred.

Like FIG. 10, FIG. 16 represents the data amount (Pixel unit) held by the engine buffer 32 as the vertical axis and the time (Pixel clock unit) as the horizontal axis. FIG. 16 illustrates a case when the output rate of the output interface unit 113 is higher than the output rate output from the data control unit 1 to the output interface unit 113.

If the output rate of the output interface unit 113 and the output rate (transfer rate) of the data control unit 1 to the output interface unit do not match, as illustrated in FIG. 16, the data amount held by the engine buffer 32 gradually decreases and the data amount of the engine buffer 32 may become 0 before the transfer of image data for one page is completed, causing an issue in printing by the printing engine. The monitor unit 112 that prevents such a situation performs processing described below to correct the transfer interval of the engine interface 12 in the main transfer according to the data amount held by the engine buffer 32.

Figure 17:
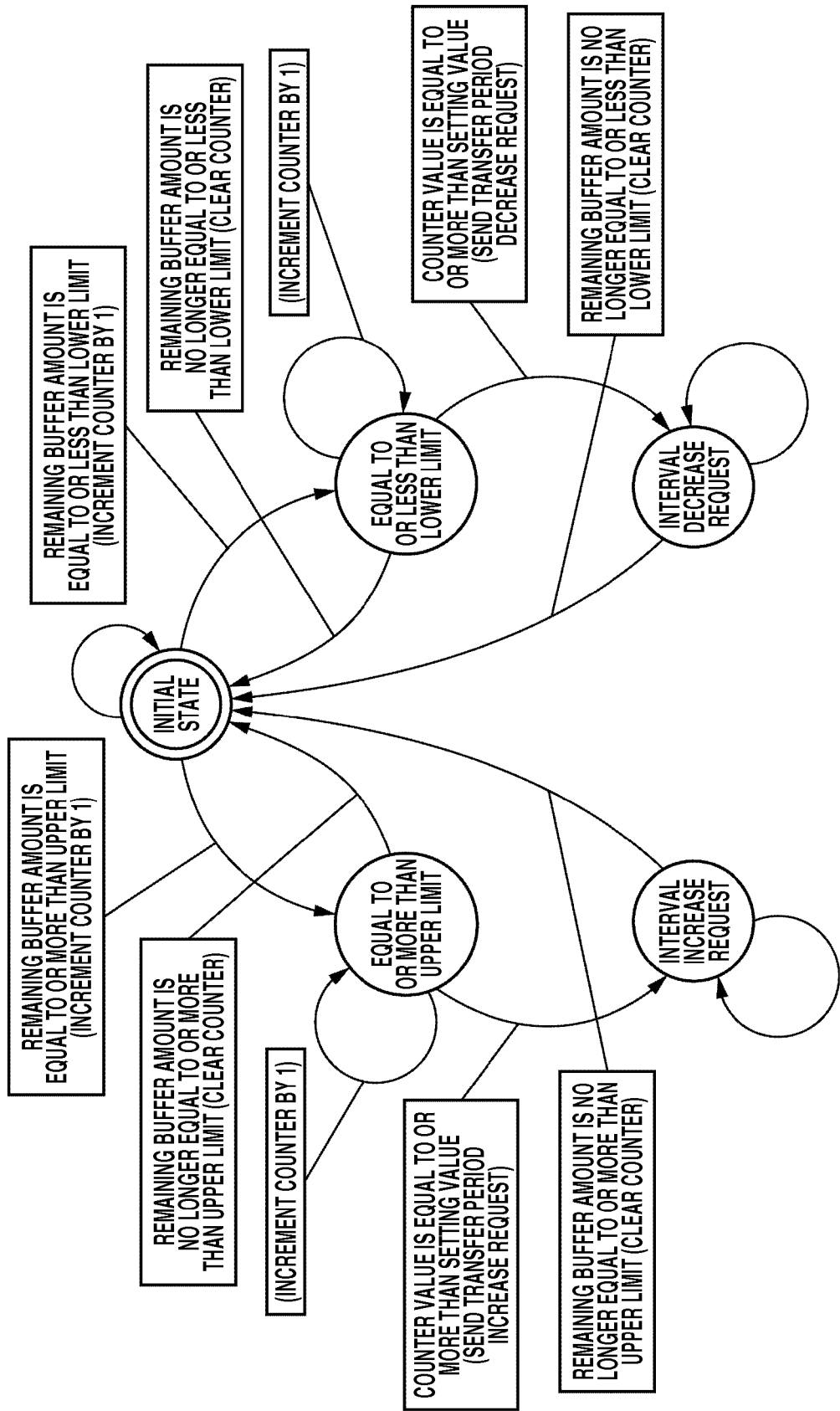
FIG. 17 illustrates a state transition diagram of a monitor unit according to the second exemplary embodiment.

FIG. 17 is a state transition diagram illustrating the operation of the monitor unit 112. The monitor unit 112 includes a correction condition setting register (not illustrated) to store the upper limit (first setting value), lower limit (second setting value), allowable overrun time indicating a period in which the data amount may exceed the upper limit continuously, and allowable underrun time indicating a period in which the data amount may fall short of the lower limit continuously to correct the transfer interval according to the data amount held by the engine buffer 32. Further, the monitor unit 112 includes a counter (not illustrated) to count the time in which the data amount exceeds the upper limit or falls short of the lower limit.

Next, processing of the monitor unit 112 when the data amount held by the engine buffer 32 falls short of the lower limit will be described. In FIG. 12, the monitor unit 112 clears the internal counter to 0 in the initial state and checks the data amount of the engine buffer 32. If the data amount of the engine buffer 32 falls short of the lower limit stored in the correction condition setting register, the monitor unit 112 adds 1 to the value of the counter and enters a state "equal to or less than the lower limit".

In this state, the monitor unit 112 checks the data amount of the engine buffer 32 in each cycle and when the data amount increases to exceed the lower limit, the monitor unit 112 clears the counter and returns to the "initial state". On the other hand, if the state in which the data amount of the engine buffer 32 falls short of the lower limit continues and the time indicated by the value of the counter becomes the allowable underrun time, the monitor unit 112 outputs a "transfer period decrease request signal" to the time management unit 111 and enters an "interval reduction request" state. If the time indicated by the counter value does not reach the allowable underrun time, the monitor unit 112 maintains the "equal to or less than the lower limit" state and increments the counter value by 1. If the data amount reaches or exceeds the lower limit in the "interval decrease request" state, the monitor unit 112 enters the "initial state".

A case when the data amount of the engine buffer 32 exceeds the upper limit is similar. If the data amount exceeds the upper limit in the "initial state", the monitor unit 112 enters an "equal to or more than the upper limit state" and counts up the counter and if the "equal to or more than the upper limit state" continues and the time indicated by the count value reaches the allowable overrun time, the monitor unit 112 outputs a "transfer period increase request" to the time management unit 111.

The data control unit 1 may process a correction signal from the image data output unit 10 by software as interrupt processing to the calculation unit 3 to modify the current transfer interval setting.

In the configuration illustrated in FIG. 13, the transfer period decrease request (requested with '1' and no request with '0') is caused to function as a CLR signal (drive signal) of the down-counter 117. If the transfer period decrease request is input, the down-counter 117 causes the comparator circuit 118 to output a transfer timing signal by outputting "0" regardless of the current count value. Then, the down-counter 117 loads the interval setting value in the following cycle from the register 61 to start the down-count operation. On the other hand, if the transfer period increase request (requested with '1' and no request with '0') is input into the OR circuit 114, the down-count operation is restarted by bringing back the count value to the set value. With the above configuration, requests of the engine buffer 32 can be handled quickly.

The correction condition setting register in the present exemplary embodiment may store only the upper limit and the lower limit. While the configuration to calculate the transfer interval has been described, various transfer intervals calculated under various conditions may be stored in the memory 8 in advance as a look-up table (LUT) so that the transfer interval can be acquired by referring to the LUT acquired by the calculation unit 3.

A detailed description of the printing unit will not be repeated in the above exemplary embodiments, but the present invention can also be applied to an ink printer or a toner printer. In an ink printer, the printing unit is a print head that jets ink. In a toner printer, the printing unit is an exposure unit that scans a photoconductive drum (a laser or the like makes a scan in exposure and the position of laser scanned in timing of a BD signal or the like is related).

In the description of the above exemplary embodiments, the calculation unit 3 acquires the buffer amount of the buffer engine 32 before the initial transfer and data is transferred based on the acquired buffer amount. However, if configured to notify the calculation unit 3 of a full signal of the engine buffer, data may be transferred until a full signal is notified without acquiring the buffer amount. In this configuration, the calculation unit 3 of the data control unit 1 may issue a print start instruction according to a notification of the full signal to activate the printing engine. One of the aspects of present embodiments might be able to increase an amount of the buffer holding transferred data even if the size of data output in real time increases.

The present invention can also be realized by performing the following processing. That is, processing performed after software (program) realizing functions of the above exemplary embodiments being supplied to a system or a device via a network or various media and the program being read by a computer (or a CPU or a micro processing unit (MPU)) of the system or the device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-148204 filed Jun. 29, 2010, which is hereby incorporated by reference herein in its entirety.

What is claimed is:

1. An information processing apparatus, comprising:
    a memory configured to hold output data;
    a transfer unit configured to transfer output data held in the memory to a buffer of an output unit using an inter-chip bus,
    wherein the transfer unit transfers a first amount of the output data held by the memory in a first mode to the buffer, and
    when the transfer unit receives a first type of notification from the output unit, the transfer unit initiates a second mode, in which:
        the transfer unit transfers a second amount of the output data multiple times to the buffer, and
        the second amount is less than the first amount; and
    a control unit configured to determine an interval based on an output data amount per unit time of the output unit and the second data amount of the output data,
    wherein the interval is between a first transfer of the second amount of output data in the second mode and a second transfer of the second amount of output data in the second mode, and
    wherein the second transfer is next data transfer from the memory to the buffer after the first transfer in the second mode.

2. The information processing apparatus according to claim 1, wherein the control unit determines the output data amount per unit time according to performance of a printing unit.

3. The information processing apparatus according to claim 1, wherein the second amount is smaller than an amount of the output data associated with one line that is outputted by a printing unit.

4. The information processing apparatus according to claim 1, wherein the first amount is equal to an amount of the output data that fully occupies the buffer.

5. The information processing apparatus according to claim 1, wherein the first amount is less than an amount of the output data that fully occupies the buffer.

6. The information processing apparatus according to claim 1, wherein a transfer rate of the output data from the memory to the buffer is less than an output data amount per unit time of the information processing apparatus.

7. The information processing apparatus according to claim 1, wherein the control unit is configured to change the interval in response to a request from the printing unit to change the interval.

8. The information processing apparatus according to claim 1, wherein the output data amount per unit time is a function of a speed at which images are outputted by the printing unit and a density of images per byte in the output data.

9. The information processing apparatus according to claim 1, wherein the first type of notification is an output start signal.

10. The information processing apparatus according to claim 1, wherein the first type of notification indicates that the buffer is beginning to be emptied.

11. The information processing apparatus according to claim 10, wherein the second buffer is a buffer of a write direct memory access controller.

12. The information processing apparatus according to claim 1, wherein the first type of notification indicates that printing has started.

13. The information processing apparatus according to claim 1, further comprising:
a second buffer for storing data to be transferred from the memory to the buffer;
wherein the second amount of the output data is an integral ratio to the size of the second buffer.

14. The information processing apparatus according to claim 1, wherein the output unit has a function to monitor an amount of data held by the buffer and notify the transfer unit in a case where the amount of data is larger or smaller than a predetermined amount.

15. An information processing method comprising:
holding output data in a memory;
transferring a first amount of the output data from the memory to a first buffer in a first mode, initiating the transfer of the output data from the memory to a printing unit, wherein the output data in the first buffer is transferred to the printing unit for printing;
receiving a first type of notification from the printing unit;
after receiving the first type of notification, initiate transferring a second amount of the output data from the memory to the first buffer in a second mode, multiple times wherein the second amount is less than the first amount;
determining an interval based on an output data amount per unit time of the printing unit and the second data amount of the output data,
wherein the interval is between a first transfer of the second amount of output data in the second mode and a second transfer of the second amount of output data in the second mode, and
wherein the second transfer is next data transfer from the memory to the first buffer after the first transfer in the second mode.

16. The information processing method according to claim 15, wherein the first amount is equal to an amount of the output data that fully occupies the first buffer.

17. The information processing method according to claim 15, wherein the first amount is less than an amount of the output data that fully occupies the first buffer.

18. The information processing method according to claim 15, wherein a transfer rate of the output data from the memory to the first buffer is less than an output data amount per unit time.

19. A non-transitory computer readable storage medium encoded with instructions for performing an information processing method comprising:
holding output data in a memory;
transferring a first amount of the output data from the memory to a first buffer of in a first mode, initiating the transfer of the output data from the memory to a printing unit, wherein the output data in the first buffer is transferred to the printing unit for printing;
receiving a first type of notification from the printing unit;
after receiving the first type of notification, initiate transferring a second amount of the output data from the memory to the first buffer in a second mode, multiple times wherein the second amount is less than the first amount;
determining an interval based on an output data amount per unit time of the printing unit and the second data amount of the output data,
wherein the interval is between a first transfer of the second amount of output data in the second mode and a second transfer of the second amount of output data in the second mode, and
wherein the second transfer is next data transfer from the memory to the first buffer after the first transfer in the second mode.

20. The non-transitory computer readable storage medium according to claim 19, wherein the first amount is equal to an amount of the output data that fully occupies the first buffer.

21. The non-transitory computer readable storage medium according to claim 19, wherein the first amount is less than an amount of the output data that fully occupies the first buffer.

22. The non-transitory computer readable storage medium according to claim 19, wherein a transfer rate of the output data from the memory to the buffer is less than an output data amount per unit time.

* * * * *